(No Model.)
J. LANDSIEDEL.
CORN HUSKING IMPLEMENT.
No. 583,758. Patented June 1, 1897.
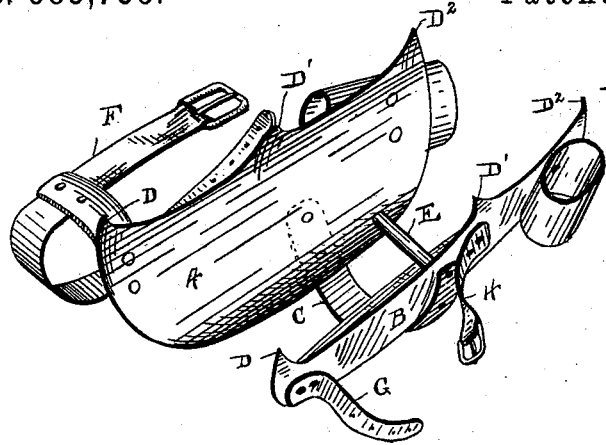
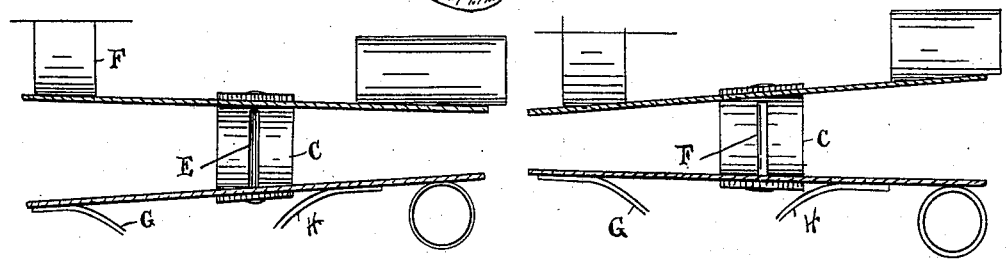
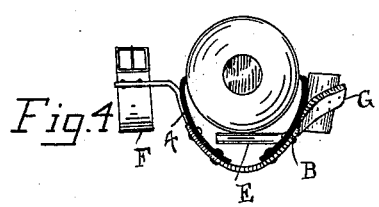
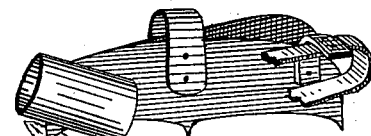
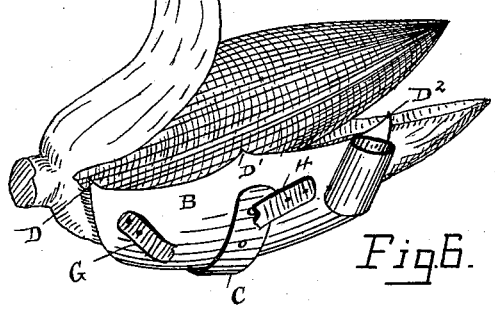
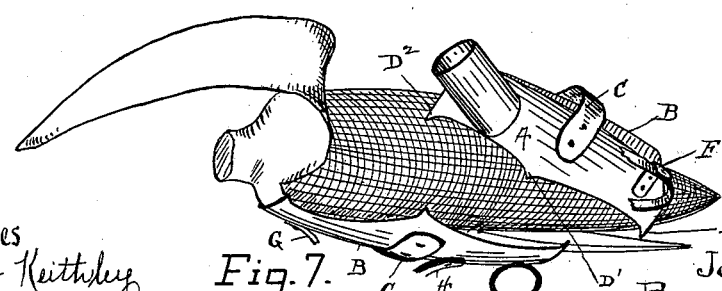
Witnesses
Arthur Keithley
C. Johnson
Inventor
John Landsiedel,
By I. M. Thurlow,
Atty.
THE NORRIS PETERS CO., PHOTO-LITHO., WASHINGTON, D. C.

UNITED STATES PATENT OFFICE.

JOHN LANDSIEDEL, OF PEORIA, ILLINOIS.

CORN-HUSKING IMPLEMENT.

SPECIFICATION forming part of Letters Patent No. 583,758, dated June 1, 1897.

Application filed January 4, 1897. Serial No. 617,952. (No model.)

*To all whom it may concern:*

Be it known that I, JOHN LANDSIEDEL, a citizen of the United States, residing at Peoria, in the county of Peoria and State of Illinois, have invented certain new and useful Improvements in Corn-Husking Implements; and I do hereby declare that the following is a full, clear, and exact description of the invention, which will enable others skilled in the art to which it appertains to make and use the same.

This invention relates to corn-husking implements for use in picking corn by hand.

The object of the invention is to provide a device for each hand which shall greatly facilitate the work, first, by permitting a greater amount of corn to be gathered in a given time; secondly, to aid in parting the ear from the husk and more easily breaking the stem; third, to have the corn cleaner when picked than can be done by the ordinary method, and, fourth, to prevent the hands becoming sore and the muscles becoming unduly strained.

By the ordinary husking-glove it is a very painful job to pick corn because of the extreme tension on the muscles necessary to separate the ear from its covering and from the stem, and especially if the frost has not yet assisted in causing the stem to become brittle and thereby easily broken.

By the use of the device to be described it has been found that more corn may be picked with much less labor and with no discomfort to the operator.

In the accompanying drawings, Figure 1 is a perspective view of the implement, showing finger and wrist straps for holding same. Fig. 2 is a section of the device, looking down between its plates and showing the said plates at an angle to each other. Fig. 3 is also a section of the device, as shown in Fig. 2, but showing the plates at an opposite angle. Fig. 4 is an end view of the device, showing manner of inserting and holding an ear of corn. Fig. 5 is a perspective view showing manner of holding an ear of corn. Fig. 6 is a perspective view showing manner of lifting the husk from the ear by means of one implement while the ear is held in another. Fig. 7 is a perspective view of the ear of corn held by one implement and showing manner of grasping the ear by another implement for parting the ear from its husk and stem.

Letters of reference in the drawings and specification correspond.

A and B are two plates of sheet metal, having a light spring C connecting them at the middle of their length, as shown. At the upper edges of the plates, at each corner and at the middle of their length, are formed two points D, $D^2$, and D', respectively, which curve toward the opposite plate, as shown. To the plate B is secured a pin E, at right angles to the plane thereof, which serves a double purpose, the use of which will be presently described. A wrist-strap F is provided on the plate A and finger-straps G and H on the plate B, whereby the device is readily held in the hand. The different positions in which the ear of corn is held are shown in Figs. 4, 5, 6, and 7. The ear is dropped into the left hand upon the pin E, which prevents the ear dropping more than about half-way. Then the implement in the right hand grasps the upper half of the ear and raises it at its point, allowing the rear end thereof to swing on the points D, but at the same time the points D' and $D^2$ keep a certain pressure on the ear, and as the ear is raised the husk is partly stripped, as shown in Fig. 5. At this time the points $D^2$ of the right-hand implement grasp the upper half of the husk and raises it, as shown in Fig. 6. Then the open end is brought down upon the ear, as in Fig. 7, and, using the points D of the lower or left-hand device as a fulcrum, the ear is broken from its stem. The pin E serves to prevent the hand being pinched accidentally, prevents the plates coming too closely together, thereby breaking the spring, and, lastly, but which is the important point, the ear of corn cannot drop lower than is necessary to bring the points D at about the middle of the ear or at its largest diameter.

The spring C is sufficiently flexible to permit the plates approaching each other at either end to any desirable extent, so that any two adjacent points may be used.

The manner of using the device is exceedingly simple and therefore readily understood in practice, and the hands of the user never become stiff or sore in the use thereof.

It makes no difference in what way the ear of corn is grasped, whether the stem thereof is toward or away from the operator, as slight changes are all that are required to accomplish the separation of the ear from its husk and stem.

What I claim as new, and desire to secure by Letters Patent, is—

In a corn-husking implement, the combination of two plates A and B a series of points or projections on their free edges, a spring C forming a flexible connection between the plates, a stop or projection attached to one of said plates at right angles to the plane thereof for the purposes set forth, and suitable straps secured to the plates substantially as described.

In testimony whereof I affix my signature in presence of two witnesses.

JOHN LANDSIEDEL.

Witnesses:
J. H. BLUSCH,
ARTHUR KEITHLEY.